United States Patent [19]

Richardson et al.

[11] Patent Number: 4,721,161

[45] Date of Patent: Jan. 26, 1988

[54] METHOD FOR DECREASING PERMEABILITY AROUND A WELLBORE

[75] Inventors: William C. Richardson, Bellaire; Lawrence E. Whittington, Katy; Lawrence R. Morrow, Richmond, all of Tex.

[73] Assignee: Texaco Inc., White Plains, N.Y.

[21] Appl. No.: 880,452

[22] Filed: Jun. 30, 1986

[51] Int. Cl.$^4$ .......................................... E21B 33/138
[52] U.S. Cl. ..................... 166/295; 166/294; 166/300; 523/130
[58] Field of Search ............ 252/8.5 C, 8.55 D, 8.514, 252/8.554; 166/273, 274, 292, 294, 300, 295; 523/130

[56] References Cited

U.S. PATENT DOCUMENTS

| | | | |
|---|---|---|---|
| Re. 30,767 | 10/1981 | Felber et al. | 166/294 X |
| 3,325,426 | 6/1967 | Markham | 523/130 X |
| 3,785,438 | 1/1974 | Jackson et al. | 166/295 |
| 3,897,827 | 8/1975 | Felber et al. | 166/274 X |
| 4,147,211 | 4/1979 | Sandiford | 166/294 X |
| 4,196,777 | 4/1980 | Kalfoglou | 166/273 |
| 4,344,487 | 8/1982 | Kalfoglou | 166/274 |
| 4,521,578 | 6/1985 | Chin et al. | 252/8.5 C X |

Primary Examiner—George A. Suchfield
Attorney, Agent, or Firm—Jack H. Park; Kenneth R. Prieem; Harold J. Delhommer

[57] ABSTRACT

The permeability of an underground formation near a wellbore can be substantially decreased by the injection of one or more slugs of an aqueous solution containing an in situ forming gel of lignosulfonate and a monomer of acrylamide or acrylic acid, initiated by persulfate or hydroxylamine and a relatively small amount of a metal salt having a polyvalent cation. The gel can be formed in the formation by delaying the mixing of all of the gel components into the aqueous solution until just prior to injection or splitting up the components into two aqueous solutions so that they are not mixed until they are in the formation.

24 Claims, No Drawings

METHOD FOR DECREASING PERMEABILITY AROUND A WELLBORE

BACKGROUND OF THE INVENTION

The present invention relates to a method for forming a gel in an underground formation surrounding a wellbore for the purpose of decreasing permeability in the formation. More particularly, the invention concerns an in situ formed lignosulfonate and acrylic gel.

Poor vertical conformance and excessive water production are two problems which afflict most hydrocarbon producing formations. Because of the existence of different geological strata having varying permeabilities, fluids injected into and produced from hydrocarbon formations tend to preferentially channel into strata of relatively high permeability. The result is that enhanced oil recovery fluids bypass large concentrations of hydrocarbons and flow through strata that have already been swept of hydrocarbons. This also results in uneconomically high water to oil ratios from producing wells.

Numerous processes have been proposed to alleviate preferential channeling through formation strata of relatively high permeabilities. Most methods involve the injection of an externally formed or in situ formed gel to lower permeability. U.S. Pat. Nos. 4,412,028; 4,494,606; 4,498,539; 4,503,912; 4,561,502 and 4,579,667 all describe the injection of polyacrylamide gels into a formation for profile control. Some polyacrylamide gels suffer from a lack of stiffness. They soften and do not always stay where placed. Polyacrylamides also have limited stability under acid conditions.

Because of their structure and inexpensive cost, lignins and lignosulfonates have been frequently used to form permeability reducing gels. Reissue Patent No. 30,767 and U.S. Pat. No. 4,074,757 inject lignosulfonate and water in the absence of other gelation promoters. These gels are set by high formation temperatures. U.S. Pat. No. 3,896,827 describes a lignosulfonate gel formed by injecting a lignosulfonate solution with a mixed activator comprised of a dichromate and a alkali metal or alkaline earth salt. Lignosulfonate and silicate gels are described in U.S. Pat. Nos. 4,257,813 and 4,275,789. Lignosulfonate gels formed with a dichromate initiator have also been used to thermally insulate wellbores, such as disclosed in U.S. Pat. No. 4,296,814. U.S. Pat. No. 4,428,429 discloses the injection of a lignin solution which will gel within the formation. A profile controlled gel formed from lignosulfonate and carboxymethylcellulose is disclosed in U.S. Pat. No. 4,110,231.

Gels containing lignosulfonates and lignins are also used as viscosity enhancers for polymer flooding and aqueous drilling fluids. Enhanced Recovery Week of June 10, 1985 describes a viscosity enhancer for polymer flooding on page 5. In this method, a lignin-acrylamide graft copolymer is placed in aqueous solution to waterflood reservoirs. However, the researchers working with the lignin-acrylamide copolymer system have been unable to attain sufficiently high enough viscosity for an effective waterflooding system.

Lignosulfonate and polyacrylate copolymers have also been employed in aqueous drilling fluids to increase the viscosity and the ability of the drilling fluids to suspend and carry away drill cuttings. U.S. Pat. Nos. 3,985,659 and 4,322,301 employ lignosulfonate and polyacrylate copolymers to increase the thixotropic properties of the clay drilling fluids while maintaining fluidity. Both methods employ peroxide initiators to copolymerize the lignosulfonate and polyacrylate.

SUMMARY OF THE INVENTION

The permeability of an underground formation near a wellbore can be substantially decreased by the injection of one or more slugs of an aqueous solution containing an in situ forming gel of lignosulfonate and a monomer of acrylamide or a acrylic acid. According to the invention, the aqueous solution will comprise about 2% to about 20% by weight of a lignosulfonate, about 2% to about 20% by weight of a monomer of acrylamide or acrylic acid, a sufficient amount of an initiator of persulfate to copolymerize the lignosulfonate and the monomer, and optionally, a relatively small amount of a metal salt having a polyvalent cation.

Hydroxylamine may also be used as an initiator, but only with an acrylic acid monomer and a required small amount of a polyvalent cation metal salt. Hydroxylamine will not gel an acrylamide monomer with lignosulfonate.

For best results, it is preferred to form the gel within the formation. This can be done by delaying the mixing of all of the gel components into the aqueous solution until just prior to injection or splitting up the components into two aqueous solutions so that they are not mixed until they are in the formation.

DETAILED DESCRIPTION

Because of their ready availability and low cost, lignosulfonates are advantageous compounds to use for profile control as opposed to much more expensive monomers and polymers. They are produced by sulfonating lignins. Lignins are polymeric substances composed of substituted aromatics found in plant and vegetable tissue. In the pulp and paper industry, lignin-containing materials such as wood, straw and other plant tissues are processed to recover cellulose. The by-product residual pulping liquors contain the lignins.

While there are some variations in the chemical structure of lignins, depending upon the tree or plant from which the lignins are obtained, where the plant was grown, and the pulping process employed, the basic structure and properties of lignins are similar. All lignins contain a reactive aromatic nucleus. Since the lignins may be chemically altered by the pulping process from the lignins found in plants and trees, the term "lignins", as used herein, means the lignin products which are obtained upon separation from cellulose. In the sulfite pulping process, the lignin materials are digested with a sulfurous acid-metal bisulfite solution resulting in the sulfonation of the lignins. In other methods for recovery of lignins, the lignins may not be sulfonated but may be chemically altered in some manner. For the present invention, lignosulfonates and not lignins are employed. However, Kraft lignins may also be sulfonated and used in this process. When used herein, the term lignosulfonate is also meant to include sulfonated Kraft lignins and similar compounds.

The lignosulfonate copolymer gels produced in the formation by the invention process offer significant flexibility. The gel times may be varied considerably. Temperature and pH may be controlled to vary the gel set times and the ratio of compounds used to form the gel may be varied to create gels of different characteristics in the formation.

The invention method is practiced by injecting an aqueous solution in one or more slugs into the formation surrounding an injection well or a production well. The aqueous solution should contain about 2% to about 20% by weight of lignosulfonate, preferably about 6% to 10% by weight of lignosulfonate, about 2% to about 20% by weight of a monomer of acrylamide or acrylic acid, preferably about 6% to 10% by weight of acrylic acid, a sufficient amount of a persulfate initiator to aid in the copolymerization of the lignosulfonate and the monomer, and about 0% to about 3% of a metal salt having a polyvalent cation of iron, titanium, vanadium, chromium or molybdenum. Iron(II) at about 0.1% to about 1% is the preferred metal ion to use with the persulfate initiator. Hydroxylamine initiator may be substituted for persulfate when an acrylic acid monomer is used, provided about 1% to about 3% of the above polyvalent metal cation salts are also present.

By tailoring the concentrations and types of gel components, gel times may be obtained ranging from several minutes to 40 hours or more. Although longer gel times are more costly in terms of equipment and additional downtime for the well, longer gel times permit the gel components to be driven farther into the formation before the gel sets up. This will usually result in a higher and more stable reduction of permeability.

Gel reaction times of at least one hour are preferred. This allows sufficient time to push the gel into the formation in a single slug. Very long gel times are undesirable from a cost standpoint.

Pushing the gel deeper into the formation away from the wellbore is usually a more important consideration when a producing well is treated to reduce water production than when an injection well is treated by the invention. This may require the use of two or more slugs containing the different components of the aqueous gel solution. For instance, the lignosulfonate and the monomer may be injected in separate slugs. But it is most preferred to inject the initiator in a second separate slug after a first slug of lignosulfonate, monomer and metal salt. Although not always required, the metal salt having a cation of iron, titanium, vanadium, chromium or molybdenum significantly aids the gel setting reaction and yields a stronger gel.

It is preferred to use a pusher slug after the gel injection in one or two slugs to flush out the wellbore and push the gel deeper into the formation. The well must then be shut-in for a time sufficient enough to allow the gel to set.

Where possible, it is desirable to isolate the offending high permeability zone by one or more packers or similar procedures. This insures that the gel injection is confined mostly to offending high permeability intervals.

As the setting of the gel is highly dependent upon the pH of the aqueous gel solution, the gel time and the location of the solution prior to the setting of the gel may be controlled by injecting the gel components at a relatively high pH, and following with a second acidic slug to set up the gel. The lignosulfonate-acrylic acid copolymer requires a pH of about 0.9 to about 3.5, preferably about 1.0 to about 2.0, to properly gel in the formation. To gel the lignosulfonate-acrylamide copolymer, a pH of about 1.2 to about 6.0, preferably about 2.0 to about 4.0, is needed.

Because of the much lower cost of lignosulfonate as compared to acrylic acid and acrylamide, it is preferred to use a high lignosulfonate/monomoer ratio. A 1/1 to about ½ ratio of lignosulfonate to acrylic acid or acrylamide is most preferred. Excess acrylic acid or acrylamide decreases gel time by factors of two or three. This is achieved, however, at extra cost as acrylic acid and acrylamide sell for approximately ten times the cost of lignosulfonate.

Temperature also affects gel time. The higher the temperature, the faster the gel will set.

Most any lignosulfonates may be used in the invention. The only restriction is that the lignosulfonates must not be modified so as to destroy the basic aromatic structure or its reactivity. It is believed that all lignosulfonates may be employed to produce the invention gels, except those chemically modified to block a phenolic hydroxy on the lignin structure. Lignosulfonates that have been propoxylated or propane sulfonated will not produce the invention gel. On the other hand, the invention gels have been produced from the following lignosulfonate derivatives: Alkaline cooked, alkaline sulfite cooked, oxidized by ozone, sulfomethylated, hydroxyalkylated, and multiple modifications involving the above chemical steps. Over fifty different lignosulfonates have been tested and all gelled with proper pH control except for the propoxylated and propane sulfonated derivatives.

Compounds 1 and 2 illustrate lignosulfonates that have been propoxylated and propane sulfonated, respectively. These two compounds are not effective lignosulfonates to produce the invention gel. It is believed that if the phenolic hydroxy site is bound with a propane or propane sulfonate grop as in Compounds 1 and 2 the lignosulfonate compound is unable to form the necessary intermediate compounds required for gelation of lignosulfonates.

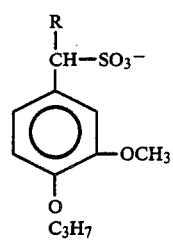

Compound 1

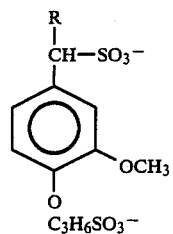

Compound 2

Lignosulfonates are more preferred in the invention for several reasons. The Kraft lignins have a lower molecular weight than lignosulfonates are less soluble in water. These differences tend to produce an inferior gel. Differences in pH in aqueous solution between Kraft lignins and lignosulfonates also effect the gel process. If Kraft lignins are made water soluble, they should also gel according to the method of this invention.

The copolymerization of the lignosulfonate and acrylic acid or acrylamide monomer must be initiated by a sufficient amount of a hydroxylamine or persulfate initiator. It is preferred to use about 4% to about 10% by weight of persulfate initiator in the aqueous gel solution. When hydroxylamine is the initiator, it is preferred to employ about 1% to about 6% by weight of hydroxylamine. Generally, gel times can be increased by reducing the concentration of the initiator.

It is desired to add a relatively small amount of a polyvalent metal salt to the aqueous gel solution to increase the effectiveness of the initiator in copolymerizing the gel components. The hydroxylamine hydrochloride or hydroxylamine sulfate is activated by the use of titanium chloride ($TiCl_3$) or a complex of titanium chloride and aluminum chloride. Chromium (II), vanadium (II), iron (II) and molybdenum (III) are also effective activators for hydroxylamine initiators. Persulfate, either as a sodium or potassium salt alone, will generate gels, but chromium ions and iron (II) ions improve the rate of gelation.

For gels made with a 1/1 ratio of lignosulfonate and acrylic acid in 70,000 ppm total dissolved solids (TDS) brine at a pH of about 1-2, initiator systems ranging from 6% by weight persulfate and 0% $FeCl_2.4H_2O$ were effective in generating gels to an upper limit of about 10% by weight persulfate and 0.75% $FeCl_2.4H_2O$. Under the same conditions, 1.0% hydroxylamine hydrochloride with 1.0% $TiCl_3$ generated gels up to about 20% hydroxylamine hydrochloride with 3.0% $TiCl_3$. When titanium is used, the pH of the aqueous solution must be about 1 to about 2 or the titanium will precipitate out.

The gels produced by the invention process are highly stable. Some gel samples produced with a ½ ratio of lignosulfonate and acrylic acid have been aged in an oven at a 120° F. for over one year and have shown no signs of deterioration. Similar gel samples have been aged in brine at room temperature for over two years without any deterioration. Thus, the use of these gels in a profile control treatment at injection and production wells should provide a stable long-term reduction in permeability. It should also be possible to partially reverse the gel treatment by injecting a strong base or peroxide to attack the acrylic acid portion of the copolymer gel.

Although invention gels have been prepared in brine containing up to 70,000 ppm TDS, gelation times tend to increase at relatively high salinity levels. In fact, hydroxylamine-titanium initiated systems would not generate a gel at salinities above about 40,000 ppm TDS.

Due to salinity problems with some of the gel systems, it is preferred in high salinity formations to inject an aqueous flushing solution prior to the gel injection to reduce connate salinity in the formation surrounding the borehole. Preferably, the salinity will be reduced to an amount below about 40,000 ppm. An aqueous postflush of the borehole is also preferred to drive all of the gel solution away from the borehole and farther into the formation.

The following examples will further illustrate the novel method of the present invention of setting gels for profile control. These examples are given by way of illustration and not as limitations on the scope of the invention. Thus, it should be understood that the composition and method of setting the gels may be varied to achieve similar results within the scope of the invention.

EXAMPLES 1-2

A hydroxylamine initiated copolymer gel was produced in two slugs. Slug 1 was composed of 7.81% Lignosite 458 (weight per weight based on total solids), a trademarked lignosulfonate sold by Georgia Pacific, 15.63% by weight acrylic acid, and 4.8% by weight titanium (III) chloride (20% active) mixed in deionized water. The pH was adjusted to about 2.0 with sodium hydroxide solution. Slug 2 contained 20% hydroxylamine hydrochloride in deionized water or brine of 33,000 ppm TDS.

Fracture model Berea cores were made by cutting nominal 2"×2"×6" cores in half along the direction of flow, placing the halves back together, and encapsulating the cores with epoxy. The fracture model cores had an initial brine permeability greater than 900 millidarcies and a tracer profile showing early breakthrough. The gel treatments were applied by syringe with small brine flushes after each slug. Shut-in time was 3 hours. As indicated by Table 1 below, the hydroxylamine initiated lignosulfonate copolymer gel substantially reduced the brine permeability in the two fracture model cores. In addition, tracer profiles showed a significant improvement in the flow pattern after treatment. A more uniform flow pattern was observed.

TABLE 1

| HYDROXYLAMINE INITIATED GEL TREATMENTS AT ROOM TEMPERATURE | | | | | |
|---|---|---|---|---|---|
| Slug Size #L | Slug Size #H | PV Throughput | $k_b^i$ | $k_b^f$ | $k_{red}(\%)$ |
| 0.93 | 0.52 | 61.2 | 3171 md | 6.7 md | 99.8 |
| 0.06 | 0.12 | 43.7 | 999 | 4.6 | 99.5 |

$k_b^i$ = initial brine permeability
$k_b^f$ = final brine permeability
$k_{red}$ = % permeability reduction

EXAMPLE 3

Five grams of lignosulfonate was diluted with deionized water up to 50 grams. The solution was adjusted to a pH of 2 with 10 ml of acrylic acid. 0.16 grams of iron (II) chloride and 3 grams of sodium persulfate were added. The gel solution was placed in a 50° C. water bath and gelation occurred in about 0.5 hours. The resulting gel was quite firm and hard.

EXAMPLE 4

Five grams of lignosulfonate was diluted with deionized water up to 50 grams and the pH of the solution was adjusted to 2. 10 ml of acrylic acid was added to the solution along with 4 ml of 20% solution of titanium trichloride. Solution pH was again adjusted to 2. Finally, hydroxylamine hydrochloride (1 gram per 4 ml water) was added and the solution rapidly gelled to create a firm gel.

EXAMPLE 5

Oil, obtained from an Illinois field, was mixed with berea sand, and then washed with brine from that same field to remove some of the oil. Marasperse 92 (5 g), a trademarked lignosulfonate supplied by Reed Lignin, Inc., was diluted with Illinois brine (TDS 40,000) up to 50 g, yielding a pH of 2. The following materials were then added to the lignosulfonate solution: acrylic acid (10 ml), iron (II) chloride (0.16 g), and sodium persulfate (3 g). This solution was added to the oil coated sand.

The mixture was then placed in an oven at 50° C. for approximately 16-18 hours. It was observed that three layers had formed. The bottom layer was sand and gel, the middle layer was flowable gel, and the top layer was oil.

EXAMPLES 6-12

Gels prepared according to the invention have been maintained at room temperature for considerable time periods. Many of the gels have remained stable with no evidence of breakdown or expulsion of water. Example 12 was prepared with a 1/1 ratio of acrylamide to lignosulfonate. The other examples shown in Table 2 were prepared with a 1/1 ratio of lignosulfonate to acrylic acid.

TABLE 2

| | Gel Stability at Room Temperature | | |
|---|---|---|---|
| Ex. | Initiator | Time Elapsed (Years) | Stability |
| 6 | persulfate | 2 | Yes |
| 7 | hydroxylamine | 1.5 | Yes |
| 8 | persulfate | 1.5 | Yes |
| 9 | persulfate | 2 | Yes |
| 10 | persulfate | 2 | Yes |
| 11 | persulfate | 1 | Yes |
| 12 | persulfate | 1 | Yes |

EXAMPLES 13-15

Lignosulfonates can be incubated with sodium persulfate in a basic solution. With these conditions, it is believed that lignosulfonates undergo some oxidation which generates a more favorable intermediate for gelation.

Marasperse 92 (5 g) in 50 g water was pH adjusted to 12. Different amounts of persulfate were added to the sample and incubated between one and four days at room temperature or 50° C. After the incubation period, acrylic acid, iron, and additional persulfate were added and the gelation time was recorded. The incubated samples were tested with starch-iodide paper to determine if oxidizing agent was still present. A blue color indicates oxidizer presence while a brown color shows the absence of oxidizer.

These reactions in Table 3 indicate that higher concentrations of persulfate during short incubation times lower the needed gelation time. The Ex. 15 incubated solution turned the test paper blue indicating the presence of oxidizer which may have contributed to the fast gelation time.

TABLE 3

| | Incubation | | | | Acrylic | | Initial | | |
|---|---|---|---|---|---|---|---|---|---|
| Ex. | $Na_2S_2O_8$ (g) | Time (days) | Temp (°C.) | SI* Test | Acid (ml) | $Na_2S_2O_8$ (g) | Temp (°C.) | Time (hrs) | Product |
| 13 | 0.5 | 1 | room | Brown | 10 | 2.5 | — | 1.50 | Flowable, Sticky |
| 14 | 1.0 | 1 | room | Brown | 10 | 2.0 | — | 0.83 | Flowable, Sticky |
| 15 | 2.0 | 3 | room | Blue | 10 | 1.0 | — | 0.25 | Rubbery |

*Starch-Iodide Test: Blue color indicates oxidizer present.

EXAMPLE 16

A fractured Berea core model that had been treated with hydroxylamine initiated Lignosite 458/acrylic acid gel was tested for oil permeability after gel treatment. The treatment had already reduced brine permeability by over 99% to 16 mD with an inlet pressure of 11 psi. Illinois blended oil was then pumped into the core at an advance rate of about 20 ft/day. Oil went into the core easily. Early breakthrough was noted with less than 0.1 PV injected.

When oil saturation of the core was completed, inlet pressure had stabilized at 21.3 psi, and the permeability was 89 mD. This shows that oil can flow through the gel treated core. The oil permeability of 89 mD is higher than the brine permeability, but lower than what would be expected for an oil permeability in Berea. Thus, the lignosulfonate copolymer gels lower the oil permeability, but not as much as the brine permeability.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method for decreasing formation permeability in an underground formation around a wellbore, comprising:
   injecting an aqueous solution having a pH of about 0.9 to about 3.5 into the formation surrounding a wellbore,
   said aqueous solution comprising about 2% to about 20% by weight of lignosulfonate, about 2% to about 20% by weight of monomer of acrylic acid, a sufficient amount of an initiator of persulfate to copolymerize the lignosulfonate and the monomer, and about 0% to about 3.0% by weight of a metal salt having a cation of iron, titanium, vanadium, chromium or molybdenum.

2. The method of claim 1, wherein about 4% to about 10% by weight of persulfate is employed as an initiator.

3. The method of claim 1, wherein the ratio of lignosulfonate to monomer is about 1:1 to about 1:2.

4. The method of claim 1, further comprising injecting a relatively low salinity slug into the formation prior to the injection of the aqueous solution to lower the connate water salinity around the borehole to a value less than about 40,000 ppm total dissolved solids.

5. The method of claim 1, further comprising injecting an aqueous slug into the wellbore after injection of the aqueous solution to clear the wellbore of aqueous solution.

6. The method of claim 1, further comprising isolating the portion of the formation wherein it is desired to decrease permeability with packers in the wellbore and injecting the aqueous solution into that isolated portion of the formation.

7. A method for decreasing formation permeability in an underground formation, comprising:
   injecting an aqueous gel solution having a pH of about 0.9 to about 3.5 into the formation surrounding a wellbore,
   said aqueous solution comprising about 6% to about 10% by weight of lignosulfonate, about 6% to about 10% by weight of a monomer of acrylic acid, about 4% to about 10% by weight of an initiator of persulfate, and about 0.1% to about 1% by weight of a metal salt having a cation of iron(II); and
   injecting an aqueous slug into the wellbore after injection of the aqueous gel solution to clear the wellbore of aqueous gel solution.

8. A method for decreasing formation permeability in an underground formation, comprising:
  injecting a first aqueous solution having a pH of about 0.9 to about 3.5 into the formation surrounding a wellbore,
  said first aqueous solution comprising about 2% to about 20% by weight of lignosulfonate, about 2% to about 20% by weight of a monomer of acrylic acid, and about 0% to about 3% by weight of a metal salt having a cation of iron, titanium, vanadium, chromium or molybdenum; and
  injecting a second aqueous solution into the formation surrounding the wellbore,
  said second aqueous solution comprising a sufficient amount of an initiator of persulfate to copolymerize the lignosulfonate and monomer of the first aqueous slug.

9. A method for decreasing formation permeability in an underground formation comprising:
  injecting a first aqueous solution having a pH of about 0.9 to about 3.5 into the formation surrounding a wellbore,
  said first aqueous solution comprising about 2% to about 20% by weight of a lignosulfonate, a sufficient amount of an initiator of persulfate to copolymerize the lignosulfonate and a monomer injected in a second aqueous slug; and
  injecting a second aqueous solution having a pH of about 0.9 to about 3.5 into the formation surrounding the wellbore,
  said second aqueous solution comprising about 2% to about 20% by weight of a monomer of acrylic acid, and about 0% to about 3% by weight of a metal salt having a cation of iron, titanium, vanadium, chromium or molybdenum.

10. A method for decreasing formation permeability in an underground formation around a wellbore, comprising:
  injecting an aqueous solution having a pH of about 0.9 to about 3.5 into the formation surrounding a wellbore,
  said aqueous solution comprising about 2% to about 20% by weight of lignosulfonate, about 2% to about 20% by weight of a monomer of acrylic acid, a sufficient amount of an initiator of hydroxylamine to copolymerize the lignosulfonate and the monomer, and about 1% to about 3.0% by weight of a metal salt having a cation of iron, titanium, vanadium, chromium or molybdenum.

11. The method of claim 10, wherein about 1% to about 20% by weight of hydroxylamine is employed as an initiator.

12. The method of claim 10, wherein the ratio of lignosulfonate to monomer is about 1:1 to about 1:2.

13. The method of claim 10, further comprising injecting an aqueous slug into the wellbore after injection of the aqueous solution to clear the wellbore of aqueous solution.

14. The method of claim 10, further comprising isolating the portion of the formation wherein it is desired to decrease permeability with packers in the wellbore and injecting the aqueous solution into that isolated portion of the formation.

15. A method of for decreasing formation permeability in an underground formation, comprising:
  injecting an aqueous gel solution having a pH of about 0.9 to about 3.5 into the formation surrounding a wellbore,
  said aqueous solution comprising about 6% to about 10% by weight of lignosulfonate, about 6% to about 10% by weight of a monomer of acrylic acid, about 1% to about 20% by weight of an initiator of hydroxylamine, and about 1% to about 3% by weight of a metal salt having a cation of titanium; and
  injecting an aqueous slug into the wellbore after injection of the aqueous gel solution to clear the wellbore of aqueous gel solution.

16. A method for decreasing formation permeability in an underground formation comprising:
  injecting a first aqueous solution haing a pH of about 0.9 to about 3.5 into the formation surrounding a wellbore,
  said first aqueous solution comprising about 2% to about 20% by weight of a lignosulfonate, about 2% to about 20% by weight of a monomer of acrylic acid, and about 1% to about 3% by weight of a metal salt having a cation of iron, titanium, vanadium, chromium or molybdenum; and
  injecting a second aqueous solution into the formation surrounding the wellbore,
  said second aqueous solution comprising a sufficient amount of an initiator of hydroxylamine to copolymerize the lignosulfonate and monomer of the first aqueous slug.

17. A method for decreasing formation permeability in an underground formation around a wellbore, comprising:
  injecting an aqueous solution having a pH of about 1.2 to 6.0 into the formation surrounding a wellbore,
  said aqueous solution comprising about 2% to about 20% by weight of lignosulfonate, about 2% to about 20% by weight of a monomer of acrylamide, a sufficient amount of an initiator of persulfate to copolymerize the lignosulfonate and the monomer, and about 0% to about 3.0% by weight of a metal salt having a cation of iron, titanium, vanadium, chromium or molybdenum.

18. The method of claim 17, wherein about 4% to about 10% by weight of persulfate is employed as an initiator.

19. The method of claim 17, where in the ratio of lignosulfonate to monomer is about 1:1 to about 1:2.

20. The method of claim 17, further comprising injecting a relatively low salinity slug into the formation prior to the injection of the aqueous solution to lower the connate water salinity around the borehole to a value less than about 40,000 ppm total dissolved solids.

21. The method of claim 17, further comprising injecting an aqueous slug into the wellbore after injection of the aqueous solution to clear the wellbore of aqueous solution.

22. The method of claim 17, further comprising isolating the portion of the formation wherein it is desired to decrease permeability with packers in the wellbore and injecting the aqueous solution into that isolated portion of the formation.

23. A method for decreasing formation permeability in an underground formation, comprising:
  injecting a first aqueous solution having a pH of about 1.2 to 6.0 into the formation surrounding a wellbore,
  said first aqueous solution comprising about 2% to about 20% by weight of lignosulfonate, about 2% to about 20% by weight of a monomer of acrylamide, and about 0% to about 3% by weight of a metal salt having a cation of iron, titanium, vanadium, chromium or molybdenum; and injecting a second aqueous solution into the formation surrounding the wellbore, said second aqueous solution comprising a sufficient amount of an initiator of persulfate to copolymerize the lignosulfonate and monomer of the first aqueous slug.

24. A method for decreasing formation permeability in an underground formation comprising:

injecting a first aqueous solution having a pH of about 1.2 to 6.0 into the formation surrounding a wellbore, said first aqueous solution comprising about 2% to about 20% by weight of a lignosulfonate, a sufficient amount of an initiator of persulfate to copolymerize the lignosulfonate and a monomer injected in a second aqueous slug; and injecting a second aqueous solution having a pH of about 1.2 to 6.0 into the formation surrounding the wellbore, said second aqueous solution comprising about 2% to about 20% by weight of a monomer of acrylamide, and about 0% to about 3% by weight of a metal salt having a cation of iron, titanium, vanadium, chromium or molybdenum.

* * * * *